March 30, 1937.  A. REIDINGER ET AL  2,075,469
VALVE GEAR FOR STEAM AND OTHER ENGINES
Filed Jan. 19, 1934  4 Sheets-Sheet 1
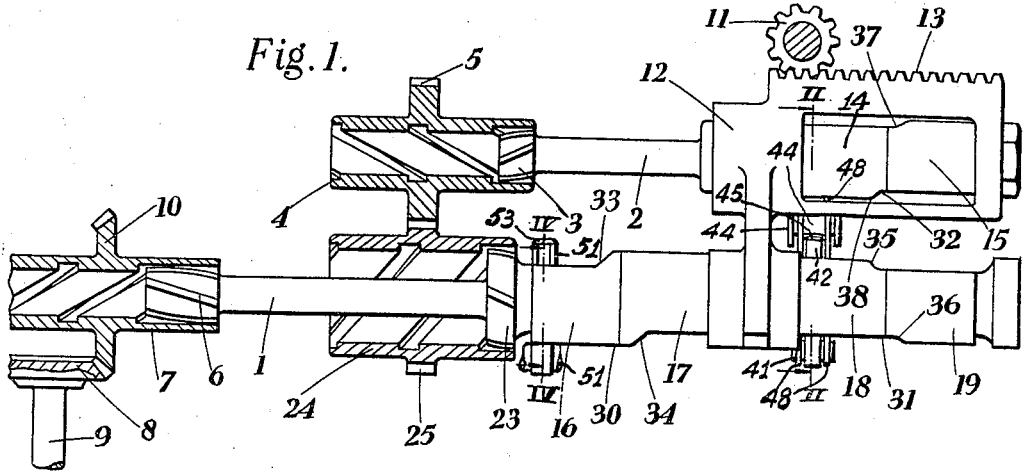
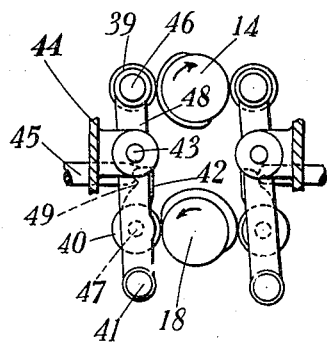
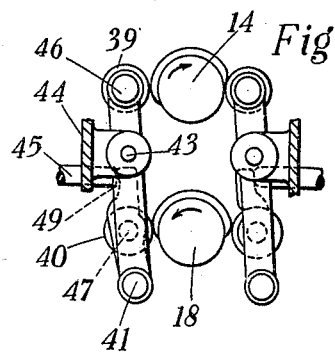
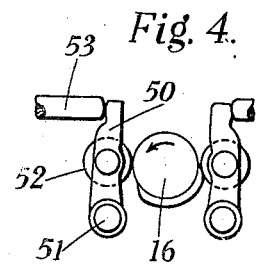
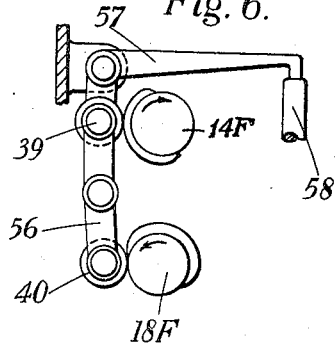
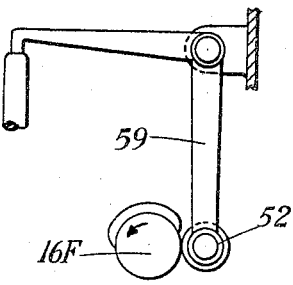
INVENTORS
A. Reidinger
T. B. Maddison
BY
ATTORNEY

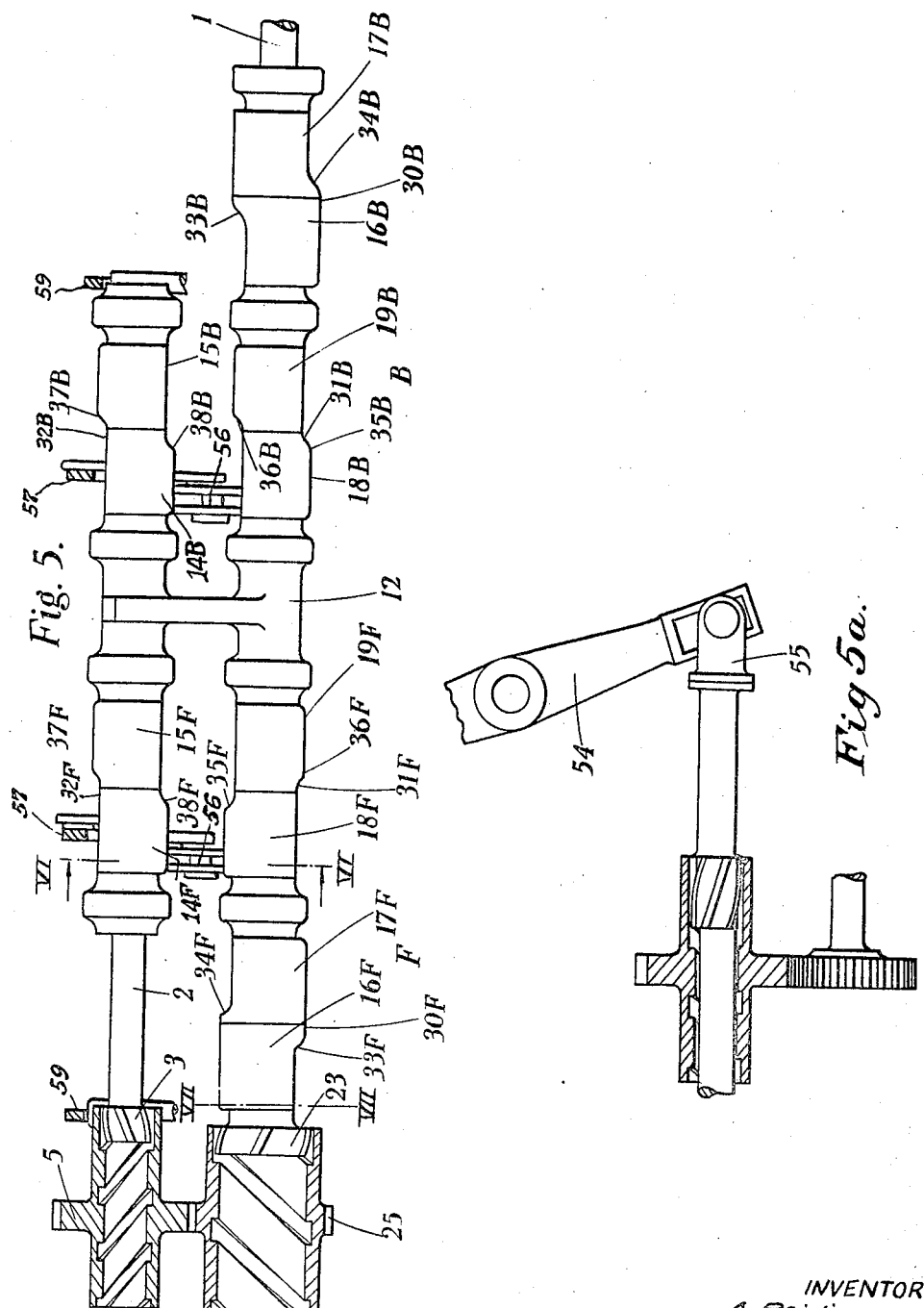

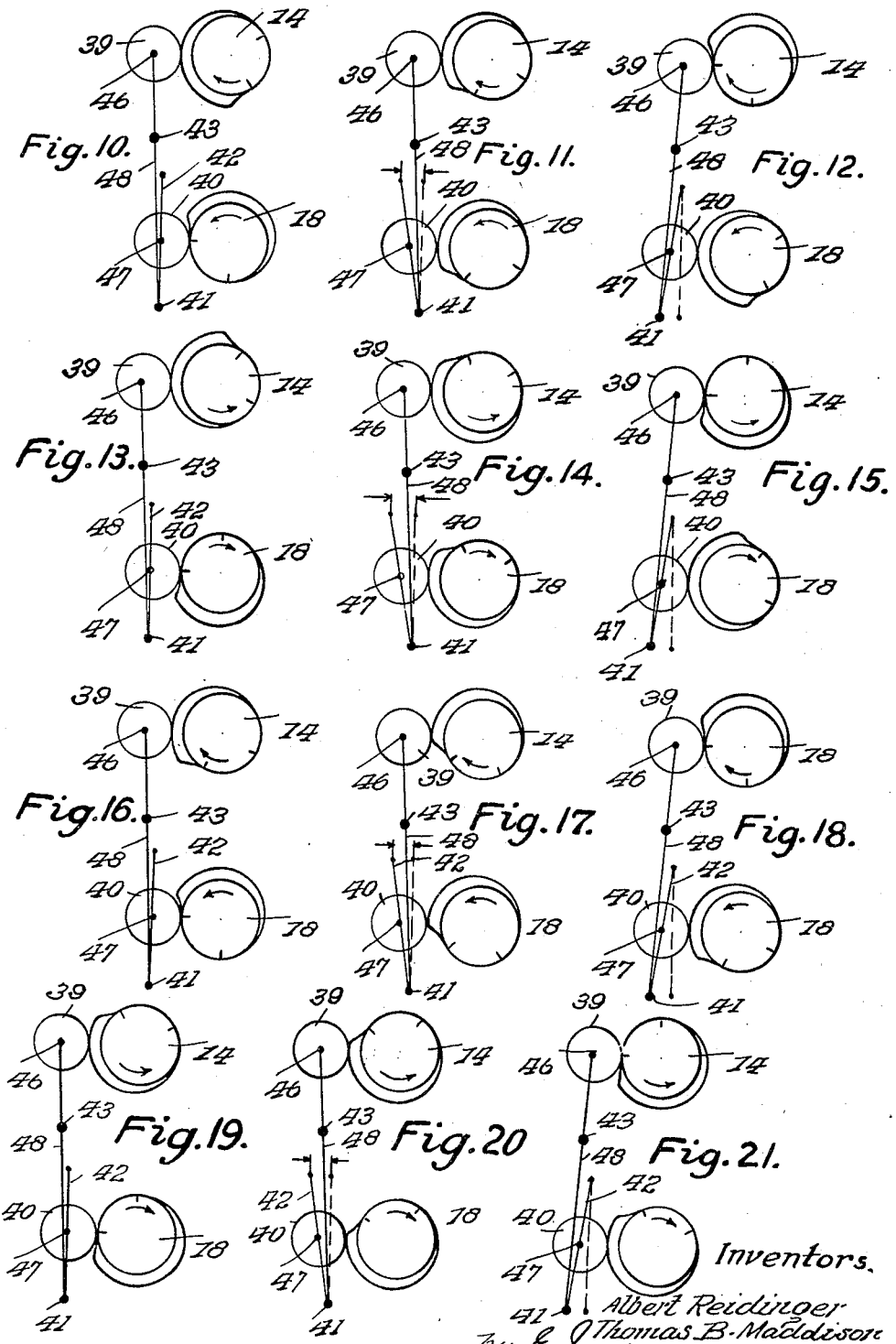

Patented Mar. 30, 1937

2,075,469

UNITED STATES PATENT OFFICE 2,075,469

VALVE GEAR FOR STEAM AND OTHER ENGINES

Albert Reidinger, Winchmore Hill, London, and Thomas Blackburn Maddison, Wimbledon Park, London, England, assignors to Herman Lindars, London, England Application January 19, 1934, Serial No. 707,386 In Great Britain January 20, 1933

13 Claims. (Cl. 121—127)

This invention relates to valve gear for reversible engines driven by steam or other elastic fluids, but in order to save repetition reference will hereinafter be made to steam only.

The object of the invention is to provide an improved cam-operated valve gear in which angular displacement of the cams is employed to vary and control the valve events.

Another object of the invention is to provide a cam-operated valve gear by means of which the engine is reversed by producing relative motion between a plurality of cams and a plurality of cam followers, whereby a different set of cams operates the valves during reverse running from that which operates them during forward running.

A further object of the invention is to provide a cam-operated valve gear having two parallel camshafts one of said camshafts only controlling only the cut-off during both forward and reverse running and the other camshaft controlling the admission, release and compression events during forward and reverse running.

With these and other objects in view the invention consists in the novel combinations and arrangements hereinafter described in detail and set out in the accompanying claims.

In the accompanying drawings which illustrate the invention and in which corresponding parts are designated by the same references:

Fig. 1 shows a sectional elevation of a valve gear designed to operate with the axes of both camshafts at right angles to the longitudinal axis of the cylinder.

Fig. 2 shows a section taken on the line II—II of Fig. 1, illustrating the admission cams, together with the associated lever device for actuating the valve spindles, in the position of maximum cut-off.

Fig. 3 shows the same section as Fig. 2, but with the cams in the position of minimum cut-off.

Fig. 4 shows a section on the line IV—IV of Fig. 1, illustrating the cam and levers operating the exhaust valve.

Fig. 5 and a continuation thereof shown at 5a show a sectional elevation of a valve gear designed to operate with the axes of both camshafts parallel to the longitudinal axis of the cylinder.

Fig. 6 shows a section on the line VI—VI of Fig. 5, illustrating the arrangement of cams and levers operating one inlet valve.

Fig. 7 shows a section on the line VII—VII of Fig. 5, illustrating one exhaust valve operating device.

Figure 8:
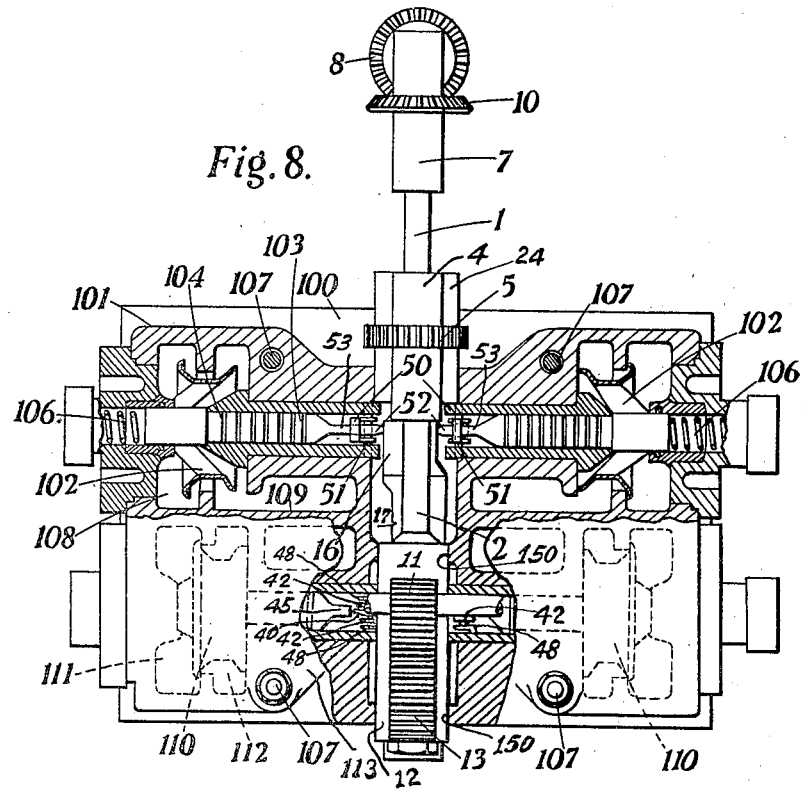

Fig. 8 shows, partly in section, a plan view of a valve chest and cylinder in which the valves are operated by the mechanism shown in Fig. 1.

Figure 9:
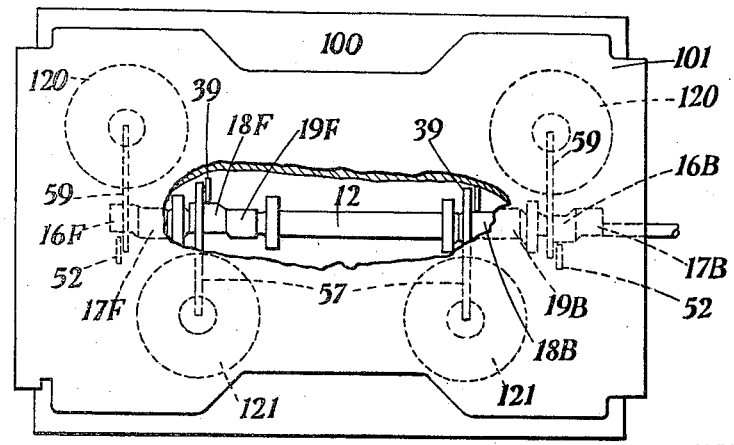

Fig. 9 shows a plan view of a valve casing (partly broken away) and cylinder in which the valves are operated by the mechanism shown in Fig. 5.

Figs. 10, 11 and 12 are diagrammatic representations of the cams and mechanism provided for controlling one of the inlet valves, the valves being set for 75% cutoff, backward gear.

Figs. 13 to 15 are similar representations, the valves being set for 75% cutoff, forward gear.

Figs. 16 to 18 are similar representations, the valves being set for 10% cutoff, backward gear.

Figs. 19 to 21 are similar representations, the valves being set for 10% cutoff, forward gear.

Referring now to the form of gear shown in Figures 1 to 4, two parallel camshafts 1, 2 are rotatably mounted in suitable bearings in a cage or supporting frame 12. A rack 13 formed on this latter permits it to be moved in a direction parallel to the axes of the camshafts. Suitable guides 150 are provided to control the movement of the cage 12.

The camshaft 1 carries four cams 16, 17, 18, 19 arranged in two pairs, and the camshaft 2 carries one pair of cams, 14, 15, which are arranged exactly opposite to the pair 18, 19 on the camshaft 1, as shown in Fig. 1. The cams 16, 17 are the exhaust control cams for forward and backward running respectively, while the cams 14, 18 control the cut-off and admission respectively for forward running, and cams 15, 19 control these events during backward running. Figs. 10 to 21 illustrate diagrammatically the cams and mechanism provided for controlling one of the inlet cams, various phases in the operation of the mechanism being shown for each of the several gear settings.

Figs. 10 to 12 show the operation when the valve is set for 75% cutoff, backward gear, the individual figures being set to show the conditions when the valve starts to open, when the valve is opened and when the valve is shut.

The three groups of Figs. 13 to 15, 16 to 18 and 19 to 21 show similar phases for the following gear settings respectively: 75% cutoff, forward gear; 10% cutoff, backward gear; and 10% cutoff, forward gear.

In each of the Figs. 10 to 21, the arrows in the cams 14 and 18 indicate their respective directions of rotation, while in Figs. 11, 12, 14, 15, 17, 18, 20 and 21 the vertical dotted lines indicate the position of the lever member 42 when the valve starts to open.

In the arrangement shown, the camshaft 1 is driven at crankshaft speed by a shaft 9, and bevel gears 8, 1 and the camshaft 2 is driven therefrom by two synchronizing toothed wheels 5, 25. The bevel wheel 10, and the toothed wheels 5, 25 are all formed integrally with hollow spindles 7, 24, 4 and each spindle is provided with internal, helical splines. The camshaft 1 has two enlarged portions 6, 23 on which are formed suitable helical splines to engage with those on the interior of the spindles 7, 24 respectively; and the camshaft 2 has an enlarged portion 3, splined to engage with the helical splines on the interior of the spindle 4.

As shown in Figures 2 and 3, the camshaft 1 rotates in an anti-clockwise direction and the camshaft 2 rotates in a clockwise direction. As stated above, Figure 2 shows the positions of the cams 14, 18 when set for maximum cut-off, i. e. full forward gear. From this figure it will be apparent that the left hand steam valve is on the point of being opened by the cam 18, and it will stay open until the remainder of the high surface of the cam 14 (as shown, some 110°) has passed the cam follower 39. In order to pass to the fully notched up or minimum cut-off position shown in Figure 3, the camshafts are moved to the left, by means of the pinion 11 and rack 13, and it can be seen from Figure 1 that the interaction of the helical splines on the enlarged portion 6 with those on the interior of the hollow spindle 7 will cause the shaft 1 to be turned further in its direction of rotation. Thus, as shown in Figure 3 (which shows the relative position of the cams at the same position of the crankshaft as does Figure 2), the cam 18 has been rotated through some 30° in an anti-clockwise direction, and the pre-admission has been correspondingly advanced.

This rotation of the shaft 1 will be transmitted to the hollow spindle 24, and it is also evident from Figure 1 that the interaction of the splines on the interior of this spindle with those on the enlarged portion 23 will cause the spindle to turn in the opposite direction to the shaft 1. Now the pitch of the splines on the enlarged portion 23 is such that the hollow spindle 24 moves in relation to the shaft 1, through a smaller angle than this latter moves in relation to the hollow spindle 7. The resultant movement of the spindle 24 being an advance in its direction of rotation equal to the difference between the angular displacement occurring between the hollow spindle 7 and the shaft 1 and the angular displacement occurring between the hollow spindle 24 and the shaft 1. This angular advance of the hollow spindle 24 is transmitted to the shaft 2 by means of the toothed wheels 5, 25. It will also be noted that the interaction of the splines on the enlarged portion 3 with those on the interior of the hollow spindle 7 will cause the shaft 2 to move angularly in relation thereto and in the direction of its rotation. The shaft 2 thus receives a total angular advance which is the sum of the angular advance of the hollow spindle 24 with respect to the shaft 1 and of the angular advance of the shaft 2 in relation to the spindle 4. In the example shown the pitch of the splines on the enlarged portion 3 is such that the angular displacement of the shaft 2 in relation to the spindle 4 is greater than that which occurs between the shaft 1 and the spindle 7.

It will be evident that the angular displacement of the shaft 2 may be increased by altering or reversing the pitch of the splines on the enlarged portion 23.

The provision of the two sets of splines to adjust the shaft 2 permits both sets to be of a convenient pitch and reduces the necessary axial movement of the camshaft.

This increased angular displacement of cutoff cams relative to admission cams is necessary because during notching up the variation required in the cutoff is several times as much as that required in the admission.

The variations required in release and compression are approximately the same as are required in admission and the exhaust control cams are conveniently mounted on the same shaft as the admission control cams, namely camshaft 1.

The cams 14, 15, 18, 19 have identical profiles, the cams 15, 19 being formed as inflexions of the cams 14, 18 respectively, to give the required alteration of events necessary when changing from backward to forward running or vice versa. The profile lengths of the cams are determined by the maximum rates of cutoff and compression required and the amount of angular displacement that is given to the camshafts by means of the helical splines mentioned above, thus for ordinary locomotive work it is convenient to have cams as shown in which the high surface extends through an angle of about 180° in the case of the admission and cut-off control cams and through about 90° in the case of the exhaust control cams. The cam blocks are of sufficient length to allow the cam followers to remain in contact with the cams during the axial movement of these latter.

The engine is reversed by sliding the camshafts in such a manner that the cam followers contact with the backward running control cams; since the reverse control cams are formed as inflexions of the forward control cams an overlap of profiles is produced, this step between each pair of cams is shown as bevelled off at 33, 34, 35, 36, 37, 38. A corresponding bevel will then be made on the cam followers in order further to facilitate reversal; and ring cams such as 30, 31, 32 and, in the form illustrated, the steam valve control cams 31, 32 are of such radius that this valve will be held closed, and the exhaust valve control cam is of such radius that this valve will be held open for the purpose of free or idle running.

Referring now to Fig. 2, this shows how the cam movements are transmitted to the valve spindles. The cams 14, 18 operate the admission and cut-off at both ends of the cylinder, and the control mechanism is therefore duplicated on each side of the camshafts; for the sake of brevity, the mechanism on one side only is described. The cam followers are rollers 39, 40 mounted on spindles 46, 47 respectively. The spindle 47 is carried in a lever member 42, which is pivoted at one end on a pivot 41 carried in one end of an outer lever member 48 and the other end 49 contacts with and actuates the valve spindle 45. The outer lever member 48 is pivoted on a pivot 43 carried in a fixed support 44 and carries the spindle 46 at its other end.

In order that the lever 42 may open the valves, the roller 39 must be in contact with the large radius of the cam 14, thus rocking the lever 48 about its fulcrum 43, and moving the pivot 41 nearer to the cam 18 and then the large radius of the cam 18 must contact with the roller 40, thus actually opening the valve. The valve is closed by the roller 39 contacting with the smaller radius of the cam 14 which results in the pivot 41 moving away from the cam 18 and the end 49 of the lever 42 moving away from the valve spindle 45, thus closing the valve.

By the means above described, the same pair of adjacent cams always operates the cutoff or admission, as the case may be, whether the engine is running backwards or forwards, and, by means of the lever arrangement, the valve lift is a multiple of the cam lift.

As stated above, Fig. 2 shows the cams in their relative positions corresponding to maximum cutoff, and Fig. 3 shows their positions for minimum cutoff.

Fig. 4 shows the exhaust valve mechanism which consists only of a roller follower 52 mounted on a lever 50, pivoted on a fixed pivot 51 and operating with its free end the valve spindle 53; the valve lift can be any desired multiple of the cam lift.

The modified form of valve gear shown in Fig. 5, is intended, as stated, to be mounted with the axes of the camshafts parallel to the longitudinal axis of the cylinder, and each cam on the camshaft is operatively connected to one valve only, instead of two as in the construction shown in Fig. 1. The mechanism may be regarded as a duplication of that shown in Figure 1 since in this case six cams are provided for each end of the cylinder. Thus the driven camshaft 1 carries eight cams in all: cams 16F, 17F for controlling the exhaust valve at the front end of the cylinder during forward and reverse running respectively; cams 18F, 19F for controlling the admission at the front end of the cylinder during forward and reverse running respectively; cams 18B, 19B control the admission at the rear end of the cylinder during forward and reverse running respectively and cams 16B, 17B control the exhaust valve at the rear end of the cylinder during forward and reverse running respectively. The camshaft 2 carries four cams in all: cams 14F, 15F for controlling the cut-off at the forward end of the cylinder and cams 14B, 15B for controlling the cut-off at the rear end of the cylinder.

It will be evident that in this form of valve gear the cams for controlling the valves at the rear end of the cylinder are set at an angle of approximately 180° to the corresponding cams controlling the valves at the front end of the cylinder. The exact value of this angle will be determined by the obliquity of the connecting rod and will preferably be such as to compensate for the disturbing effect of this latter. In this respect, this form of gear is preferable to the form shown in Figure 1 where such compensation is not possible owing to the fact that one cam operates valves at both ends of the cylinder.

Alternative means for producing the axial movement of the camshafts are shown in Figure 5: namely a slotted lever 54 which actuates a member 55, bearing against one end of the camshaft 1.

Fig. 6 shows an alternative device for actuating the inlet valves in which the rollers are mounted at the ends of a lever 56, which is fulcrumed on one arm of a bell crank lever 57. This latter rocks about a fixed pivot and its other arm operates the valve spindle 58. For the operation of the exhaust valves a simple bell crank lever 59 is used, as shown in Fig. 7.

As indicated above, when the inlet valve control cam followers are in contact with the corresponding cams along the line AA and the exhaust valve control cam followers are in contact with the corresponding cams along the line BB, the gear is set for full forward running, i. e. the cut-off is at a maximum and this is the position used for starting from rest. As the engine speed increases the camshafts are moved to the left in relation to the cam followers, as seen in Figures 1 and 5, and the cut-off is thus decreased and the admission point is advanced as already explained. Further leftward movement of the camshafts brings the ring cams into contact with the cam followers and thus sets the valves in the correct position for idle or free running. Still further leftward movement brings the reverse running control cams into operation and the gear is then set for reverse running with the earliest cut-off. For the full reverse gear position, the camshafts are moved as far to the left as possible.

As shown in Fig. 8, the camshafts 1 and 2 lie at right angles to the longitudinal axis of a cylinder 100 and pass through a valve casing 101 which is bolted to the top of the cylinder by bolts 107. The valves shown are of the double beat type and comprise two exhaust valves 106 and two inlet valves 110. These valves are opened by the action of the cams and closed by spring action; the springs 106 which operate the exhaust valves are shown and similar springs are provided for the inlet valves.

The inlet valves, when open, allow steam to pass from chambers 111 to chambers 112 which are in communication with the ends of the cylinder. Steam reaches the chambers 111 from an admission chamber 113, which is connected to a steam pipe by means of a connection 105.

The exhaust valves, when open, allow steam to pass from chambers 108 to chambers 109; the former being in communication with the ends of the cylinder and the latter with an exhaust chamber which is not shown, but which has the same external form as the admission chamber 113, and communicates with the engine blast through a connection similar to the steam pipe connection 105.

All the valves have labyrinth packings provided on their spindles to minimize any steam leakage; Fig. 8 shows the labyrinth packings 104 on the spindles 103 of the valves 106. It will be noted that the left hand valve 106 is shown in the open position.

In the arrangement shown in Fig. 9 the valve casing 101 is modified to accommodate the camshafts 1 and 2, which are now parallel to the longitudinal axis of the cylinder, and the valves 120 and 121 which are of the same form as the valves 106 and 110 shown in Fig. 8, but move in a substantially vertical direction. The inlet valves are designated by the reference 121, and the exhaust valves by the reference 120.

We claim:—

1. A mechanism for controlling the supply of elastic fluid to an engine cylinder comprising an inlet valve for each end of the cylinder, an exhaust valve for each end of the cylinder, a pair of separately mounted cams for controlling each of said inlet valves during forward running, a second pair of separately mounted cams for controlling each of said inlet valves during reverse running, means for operating said two pairs of cams to give infinitely variable admission and cut-off during reverse and forward running, a cam for controlling each of said exhaust valves during forward running, a second cam for controlling each of said exhaust valves during reverse running and means for controlling all of said exhaust valve operating cams to give infinitely variable release and compression.

2. A mechanism for controlling the supply of elastic fluid to an engine cylinder comprising an inlet valve for each end of the cylinder, an exhaust valve for each end of the cylinder, two parallel camshafts arranged at right angles to the longitudinal axis of said cylinder, a set of two cams carried by one of said camshafts, two sets of two cams carried by the other of said camshafts, one of said two sets of cams being arranged opposite to said set on said first-mentioned camshaft, two pairs of cam followers arranged on opposite sides of said camshafts, one follower of each of said pairs of cam followers being in contact with one cam of said first-mentioned set of two cams and the other follower of each of said pairs of cam followers being in contact with one cam of said set of two cams carried by said second-mentioned camshafts and arranged opposite to said set of cams on said first-mentioned camshaft, means for transmitting the movement of said pairs of cam followers to said inlet valves, two single cam followers arranged in contact with and on opposite sides of one of the cams of the other set of said two sets of cams carried by said second-mentioned camshaft, means for transmitting the movement of said single cam followers to said exhaust valves, engine-driven means for driving said camshafts and means for moving said camshafts in relation to said cam followers to bring the second cam of each of said three sets of two cams into contact with said cam followers.

3. A mechanism for controlling the supply of elastic fluid to an engine cylinder comprising an inlet valve for each end of the cylinder, an exhaust valve for each end of the cylinder, a camshaft, a plurality of cams mounted upon said camshaft and arranged in sets of two, one cam follower arranged in contact with one cam of each of said sets of cams, means for operating said sets of cams to give infinitely variable cut-off during forward and reverse running, a second camshaft arranged parallel to said first-mentioned camshaft, a plurality of cams arranged in sets of two and mounted upon said second camshaft, a cam follower in contact with one of each of said last-mentioned sets of cams, means for connecting one of said last-mentioned sets of cams to an exhaust valve, means for connecting others of said last-mentioned sets of cams to an inlet valve, and means for adjusting said second camshaft to give infinitely variable admission, release and compression during forward and reverse running.

4. A mechanism for controlling the supply of elastic fluid to an engine cylinder comprising an inlet valve for each end of the cylinder, an exhaust valve for each end of the cylinder, two parallel camshafts arranged parallel to the longitudinal axis of the cylinder, four cams mounted upon one of said camshafts and arranged in sets of two, eight cams mounted on the other of said camshaft and arranged in sets of two, two of said last-mentioned sets being arranged opposite to said two sets on said first-mentioned camshaft, a pair of associated cam followers arranged to co-operate with each pair of said oppositely-arranged sets of cams and having the cam followers of each pair in contact with an oppositely arranged pair of cams, means for transmitting the movement of one of said pairs of cam followers to one of said inlet valves, means for transmitting the movement of the other of said pairs of cam followers to the other of said inlet valves, a single cam follower arranged in contact with one cam of each of said two other sets of cams mounted on said camshaft with eight cams, means for transmitting the movement of said single cam followers to said exhaust valves, means for driving said parallel camshafts and means for moving said camshafts in relation to said cam followers in order to reverse said engine.

5. Valve operating cam means for use in elastic fluid-driven engines comprising an inlet valve at each end of the cylinder, an exhaust valve at each end of the cylinder, two parallel camshafts, a cage for supporting said camshafts, means for moving said cage in a direction parallel to the longitudinal axes of said camshafts, cams mounted in pairs on said camshafts, said cams having uniform lobes, a cam follower in contact with one cam of each of said pairs of cams, means for combining the movement of two of said cam followers in contact with two cams each of which is mounted on a different camshaft, means for transmitting said combined movement to one of said inlet valves, means for transmitting the movement of another of said cam followers to one of said exhaust valves, means for driving said camshafts and means for producing relative movement between said pairs of cams and said cam followers to bring the other cam of each of said pairs of cams into contact with said cam followers.

6. Valve-operating cam means for use in elastic fluid-driven engines comprising two parallel camshafts, an engine-driven member for driving said camshafts, cams mounted on said camshafts, a cage for carrying said camshafts, a series of helical splines formed upon a cylindrical portion of one of said camshafts, a hollow spindle having helical splines formed on its interior surface and cooperating with said helical splines formed on said camshaft, a toothed wheel mounted on said hollow spindle and engaging with a toothed wheel driven by said engine-driven member, a second series of helical splines formed upon a second cylindrical portion of said camshaft, a second hollow spindle having internal helical splines cooperating with said second series of splines on said camshaft, a second toothed wheel mounted on said second hollow spindle, a third toothed wheel mounted upon a third hollow spindle and engaging with and having the same number of teeth as said second toothed wheel, internal helical splines formed on said third hollow spindle and of opposite hand to said helical splines on said second hollow spindle, a series of helical splines formed on a portion of the other of said camshafts and cooperating with the internal splines of said third hollow spindle, cam followers associated with said cams and means for transferring the movement of said cam followers to the valves of said engine.

7. An arrangement of cam followers for use in cam operated valve gears for elastic fluid-driven engines comprising a member connected to a valve, a pivot, an operating lever having one end in contact with said member and having its other end carried upon said pivot, a cam follower mounted upon said operating lever, a second cam follower, a main lever carrying said pivot at one end and carrying said second cam follower at its other end, and a fixed pivot carrying said main lever.

8. A cam operated valve gear for reversible elastic fluid driven engines, comprising a valve, two camshafts, a cam on each one of said shafts, means actuated by both said cams to operate said valve, means for driving the first of said camshafts from said engine, control means for varying the angular relation between said first camshaft and said drive, means for driving the second of said camshafts only from said first camshaft, said driving means transmitting the angular movement of said first camshaft in relation to said drive, to said second camshaft and including means for varying the angular relation between said first and second camshafts in such a manner that said second camshaft has a greater angular displacement in relation to said driving means than has said first camshaft.

9. A cam operated valve gear for reversible elastic fluid driven engines, comprising an inlet valve, an exhaust valve, two camshafts, cams on the first of said camshafts arranged to control the admission, release and compression events during forward and reverse running, cams on the second of said camshafts for controlling the cut-off during forward and reverse running, means operatively connecting said cams and valves, means for driving said first camshaft from said engine, means for producing an angular displacement between said drive and said first camshaft, means for driving said second camshaft only from said first camshaft and arranged to transmit said angular displacement from said first camshaft to said second camshaft, means for producing an angular displacement of said second camshaft in relation to said first camshaft, and control means for producing both said angular displacements simultaneously.

10. A cam operated valve gear for reversible elastic fluid driven engines, comprising an inlet valve, an exhaust valve, two camshafts, cams on the first of said camshafts arranged to control the admission, release and compression events during forward and reverse running, cams on the second of said camshafts for controlling the cut-off during forward and reverse running, means operatively connecting said cams and valves, and means operable by a single control to produce an angular displacement of said first camshaft in relation to the crank of said engine and also to produce a larger angular displacement of said second camshaft in relation to the crank of said engine, said means transmitting the angular displacement of said first camshaft to said second camshaft.

11. Valve-operating cam means for use in steam and other elastic fluid driven engines, comprising two parallel camshafts, an engine driven member for driving said camshafts, cams mounted on said camshafts, means for supporting said camshafts in such a manner that they are free to rotate, a series of helical splines formed upon a cylindrical portion of one of said camshafts, a hollow spindle having helical splines formed on its interior surface and cooperating with said helical splines formed on said camshaft, a toothed wheel mounted on said hollow spindle and engaging with a toothed wheel driven by said engine-driven member, said splines being arranged to advance said camshaft in the direction of its rotation during notching up, a second series of helical splines formed upon a second cylindrical portion of said camshaft, a second hollow spindle having internal helical splines cooperating with said second series of splines on said camshaft, said second series of splines being arranged to displace said second hollow spindle in relation to said camshaft in the opposite direction to and by a less amount than said camshaft is displaced in relation to said driven member, a second toothed wheel mounted on said second hollow spindle, a third toothed wheel mounted upon a third hollow spindle and engaging with and having the same number of teeth as said second toothed wheel, internal helical splines formed on said third hollow spindle and of opposite hand to said helical splines on said second hollow spindle, a series of helical splines formed on a portion of the other of said camshafts and cooperating with the internal splines of said third hollow spindle, said last-mentioned series of splines being arranged to advance said other camshaft in relation to said third toothed wheel in the direction of its rotation during notching up, cam followers associated with said cams, and means for transferring the movement of said cam followers to the valves of said engine.

12. A cam operated valve gear for reversible elastic fluid driven engines, comprising an inlet valve, an exhaust valve, two camshafts, cams on the first of said camshafts arranged to control the admission, release and compression events during forward and reverse running, cams on the second of said camshafts for controlling the cut-off during forward and reverse running, means operatively connecting said cams and valves, means for driving said first camshaft from said engine, means for producing an angular displacement between said drive and said first camshaft, means for driving said second camshaft only from said first camshaft and arranged to transmit said angular displacement from said first camshaft to said second camshaft, means for producing an angular displacement of said second camshaft in relation to said first camshaft, control means for producing both said angular displacements simultaneously, said control means also serving to produce axial movement of said camshafts in relation to said cam followers to bring other cams in contact therewith for reverse running.

13. A cam operated valve gear for reversible elastic fluid driven engines, comprising an inlet valve, an exhaust valve, two camshafts, cams on the first of said camshafts arranged to control the admission, release and compression events during forward and reverse running, cams on the second of said camshafts for controlling the cut-off during forward and reverse running, said cams arranged in associated pairs, each one of said pairs of cams having a similarly shaped lobe to the other cam of the same pair, said lobes being set at an angle to one another and beveled at their oppositely-facing edges, ring cams mounted on said camshafts and shaped to hold said exhaust valve permanently open and said inlet valve permanently closed, means operatively connecting said cams and valves, means for driving said first camshaft from said engine, means for producing an angular displacement between said drive and said first camshaft, means for driving said second camshaft only from said first camshaft and arranged to transmit said angular displacement from said first camshaft to said second camshaft, means for producing an angular displacement of said second camshaft in relation to said first camshaft, and control means for producing both said angular displacements simultaneously.

ALBERT REIDINGER.
THOMAS BLACKBURN MADDISON.